United States Patent [19]
Milia et al.

[11] Patent Number: 5,226,146
[45] Date of Patent: Jul. 6, 1993

[54] DUPLICATE TAG STORE PURGE QUEUE

[75] Inventors: Andrew Milia, Burlington; Richard G. Bahr, Cambridge, both of Mass.

[73] Assignee: Hewlett-Packard Company, Palo Alto, Calif.

[21] Appl. No.: 830,961

[22] Filed: Feb. 5, 1992

Related U.S. Application Data

[63] Continuation of Ser. No. 263,711, Oct. 28, 1988, abandoned.

[51] Int. Cl.$^5$ .............................. G06F 12/12
[52] U.S. Cl. ................... 395/425; 364/DIG. 1; 364/243; 364/243.4; 364/243.41; 364/243.42; 364/243.44
[58] Field of Search ................. 395/400, 425

[56] References Cited

U.S. PATENT DOCUMENTS

| | | | |
|---|---|---|---|
| 4,142,234 | 2/1979 | Bean et al. | 364/200 |
| 4,322,795 | 3/1982 | Lange et al. | 364/260 |
| 4,332,010 | 5/1982 | Messina et al. | 364/200 |
| 4,471,429 | 9/1984 | Porter et al. | 364/200 |
| 4,525,777 | 6/1985 | Webster et al. | 364/200 |
| 4,695,943 | 9/1987 | Keeley et al. | 364/200 |
| 4,695,951 | 9/1987 | Hooker et al. | 364/200 |
| 4,701,844 | 10/1987 | Thompson et al. | 364/200 |
| 4,747,043 | 5/1988 | Rodman | 364/200 |
| 4,755,930 | 7/1988 | Wilson, Jr. et al. | 364/200 |
| 4,775,955 | 10/1988 | Liu | 364/900 |
| 4,785,395 | 11/1988 | Keeley | 364/200 |
| 4,807,110 | 2/1989 | Pomerene et al. | 364/200 |
| 5,010,475 | 4/1991 | Hazawa | 395/400 |
| 5,058,006 | 10/1991 | Durdan et al. | 395/325 |

*Primary Examiner*—Joseph L. Dixon
*Assistant Examiner*—Rebecca L. Rudolph
*Attorney, Agent, or Firm*—Richard F. Schuette

[57] ABSTRACT

A method and apparatus for selectively invalidating tag data related to data stored in high speed processor cache memory systems. The tag data to be invalidated, due to processor operations and cache memory misses, is stored in two tag stores and indicia related to the tag data to be invalidated is stored in a purge queue. Further improvement in system performance is provided by selective tag data and indicia elimination.

3 Claims, 3 Drawing Sheets

DUPLICATE TAG STORE PURGE QUEUE

CROSS REFERENCE TO RELATED APPLICATION

This is a continuation of copending application Ser. No. 07/263,711 filed on Oct. 28, 1988, now abandoned.

FIELD OF THE INVENTION

Present invention relates to cache memory systems and, in particular, cache memory systems for storing data and tag signals, including elements for manipulating the cache data according to the tag signals.

BACKGROUND OF THE INVENTION

A data processing system may opt to duplicate the contents of main memory so that one or more processors may have fast private access to those contents. This technique is commonly known as memory caching. A cache-based system in which there are multiple sources of data modification must handle the problem of the cached data becoming inconsistent with the main store original. Sources of data modification are typically processors or DMA based I/0 devices. The problem, also known as cache coherency enforcement, is that every cache must ultimately see the consequences of all main memory modifications, regardless of their origin. There are software and hardware solutions to this problem. A popular hardware approach is for every cache to watch the actions of every other and to invalidate or update itself as appropriate. The so-called snoopy cache may work with either write-through caches or write-back cache strategies. In the former case, all snooping activity follows stores to main memory. In the latter case, activity typically is triggered by reads from main memory. The activity each cache pursues usually involves first checking whether the data which is being stored or read is held by itself. The check is accomplished by examining either the cache tag directory also known as the tag store, or a duplicated copy of that directory. If there is a match in the examined directory, a variety of actions ensue depending upon the particular cache coherency strategy that is followed by the system.

There are complications to this approach that are handled in the processor. While the overall approach of store through snoopy caches is a well-known technique, there are a number of problems and solutions to the problems, that are peculiar to this implementation.

The first problem is that continually accessing the operand and instruction cache tag stores to make the address collision determination would produce heavy processor performance losses.

A second complication is that the caches in the example system are virtually indexed. As a result a physical address on the bus is insufficient to index into the cache tag stores to make the address collision decision.

A third and very major complication, is that the operation of bus transfer, duplicate tag store lookup, and cache invalidation takes many more cycles than one to complete.

A fourth complication is that it is undesirable to require RAM's in the duplicated tag stores that are multiported or significantly faster than the cycle time. The undesirability reflects itself in availability or cost or both.

A fifth source of complication is the pended read bus protocol. This bus protocol allows writes to occupy the bus between the time of a read address transfer and the return of read data. The concern is that the write could collide with the returning read data rendering the data stale before it is even received.

SUMMARY OF THE INVENTION

A duplicate tag store according to the present invention comprises apparatus which guarantees cache coherency in a multiprocessor environment while using only single ported RAM memory. The duplicate tag store purge queue provides a mechanism for decoupling invalidates of duplicate tag store entries, and provides an economical technique for reducing the number of needless cache invalidates and thus effectively increases processor speed.

The duplicate tag store is a copy of the processor's main cache tag store used to monitor the main system bus for transactions that would affect the processor's cache. All stores by other processors and devices are looked up in the duplicate tag store then the entry containing that address is invalidated in the processor cache thus guaranteeing timely elimination of stale data. The duplicate tag store is used rather than the principal tag store in order to minimize interference with the processor's activity.

In order to minimize cycle time and maximize the size of the high speed rams used, only one operation per cycle, a read or a write, can be performed. Since transactions by other devices on the system bus are not predictable and can be going on all the time every cycle the duplicate tag store must potentially be available for a lookup. In cases where the lookup finds a match in the duplicate tag store and that entry is invalidated in the main cache, the potential exists for the operation to repeat itself because the entry remains valid in the duplicate tag store thus degrading processor performance with useless cache invalidates which can collide with processor cache operations.

The duplicate tag store purge queue contains the addresses of entries that require invalidation in the duplicate tag store. It is decoupled from normal duplicate tag store lookup and allocation which is slaved to the system bus and opportunistically uses otherwise null cycles to invalidate entries in the duplicate tag store. Thus, the duplicate tag store mechanism according to the present invention is an almost perfect filter that passes only invalidate signals which are required to use the main cache.

The duplicate tag store purge queue includes a mechanism which compares each address in the purge queue with each address that is allocated in the duplicate tag store. If a match is found, the matching entry is deleted from the purge queue so that it does not invalidate an entry that was newly allocated. If the purge queue overflows, the integrity of the system remains intact since at worst this would mean an unlikely yet harmless redundant invalidation of the main cache caused by a stale entry remaining in the duplicate tag store after being invalidated in the main cache.

BRIEF DESCRIPTION OF THE DRAWING

These and other features of the present invention will be better understood by reading the following detailed description, taken together with the drawing, wherein.

Figure 1:
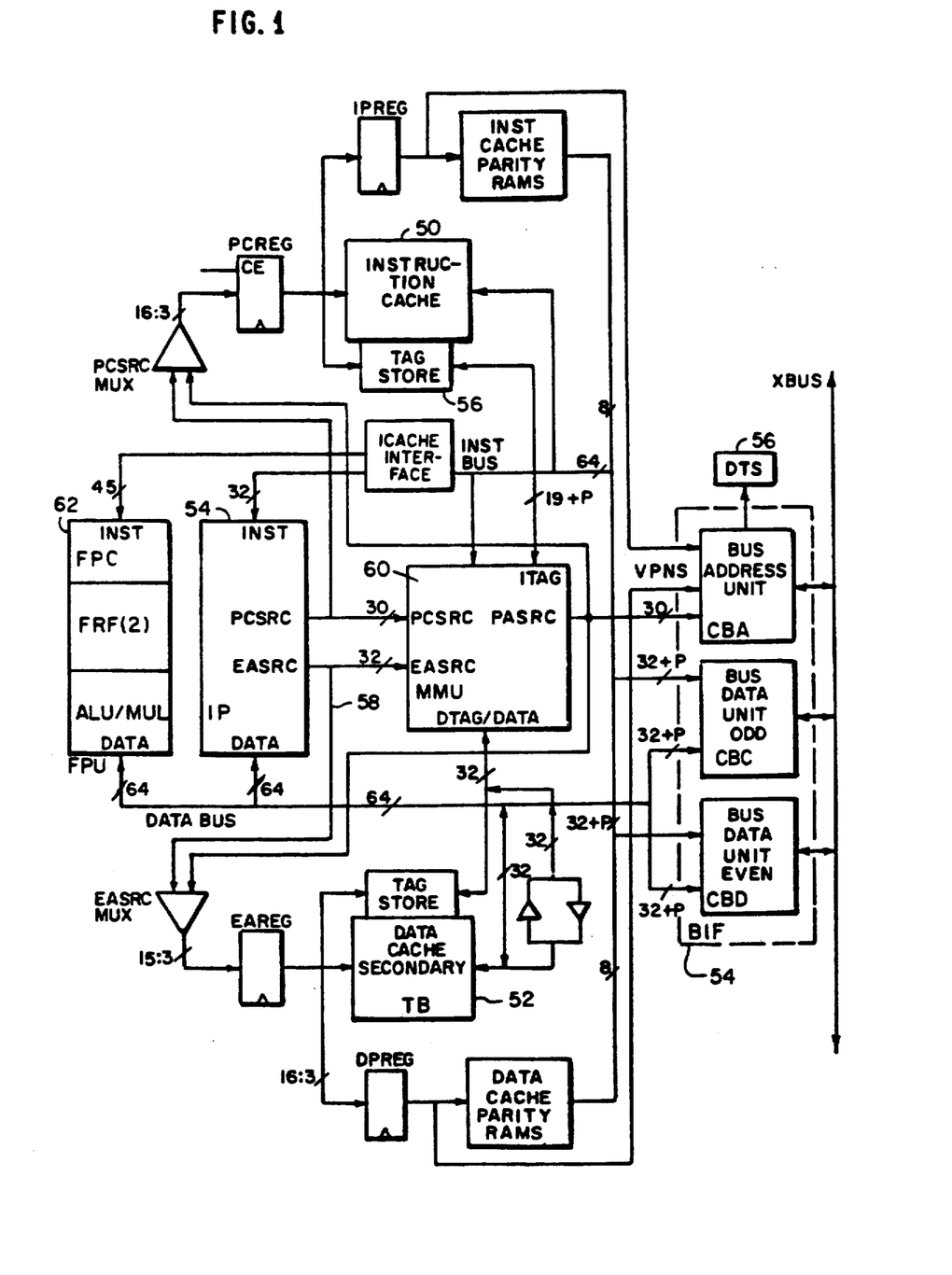
FIG. 1 is a block diagram of an exemplary system including the present invention.

A detailed schematic of the DTS portion of FIG. 1 is shown in the Appendix, available in the patented file.

DETAILED DESCRIPTION OF THE INVENTION

The duplicate tag purge queue operates in a context of a multiprocessor system which uses snoopy caches that rely upon duplicated cache tags. FIG. 1 is the processor level block diagram that shows the caches 50 and 52, bus interface or BIF 54 and the duplicated tag stores or DTS 56. In the example of FIG. 1, there are two caches in each processor. One cache 50 is dedicated to instruction access and the second cache 52 to data or operand access. Each cache is direct mapped. Write addresses are generated in the IP 60 and are presented on the EASRC bus 58. Write data is supplied by either the IP 60 or the FPU 62. The writes only immediately affect the operand cache 52. The write address and data are subsequently forwarded to the system bus 64 through a variable depth write queue in the bus interface (BIF) 54. Once on the system bus, the writes propagate to main memory (not shown). In addition, all processors, including the write transmitting one, check to see whether the bus write collides with instructions that may be cached locally to that processor. All processors, excluding the write transmitting one, check to see whether the write collides with operands that may be cached locally to the processor. If an address collision is detected, the locally cached instruction or operand is marked as invalid. In this manner, system-wide cache coherency is maintained.

The detailed description of the BIF's cache coherency algorithm follows.

The solution to the problem of performance loss due to continually accessing a cache tag stored is to duplicate the cache tags stored. The duplicated tag stores associated with the data cache 52 and instruction cache 50, respectively, are referred to as the duplicate operand tag store (DOTS) and the duplicate instruction tag store (DITS), or jointly as the DTS. The solution of the problem of virtually indexed caches is to have a portion of the virtual address accompany the full physical address during the backplane bus transfer. These bits are referred to as the VPN in the discussion following. The solution to the problem of multiple cycles required for bus transfer, duplicate tag store lookup and cache invalidations is to provide a highly pipelined invalidate processing approach that breaks the procedure into six steps: bus transfer, bus command decode, DITS/DOT's lookup, physical address (PA) bus requesting, PA bus transfer, and cache invalidation. The first three occur unconditionally upon seeing a bus write operation. The final three occur only if an address collision is detected. An additional complication in this regard is that the return of processor read data takes precedence over the processing of invalidates so that the six state sequence may be "stalled" in most of the pipeline stages. The solution to the problem of avoiding extremely high speed RAM's or a multiported duplicate tag store is to strictly slave the use of the DITS and DOTS to use of the system bus. The solution to the problem of write collision with the outstanding read is to inhibit cache loading if such happens. The returning read data may be used, but it must not be cached. The above novel solutions and other inventive features according to the present invention are presented in further detail below.

The duplicate tag store (DTS) is a copy of the corresponding processor's instruction and operand cache tag store used to compare addresses being modified on the BUS against the contents of the caches. If a match between a location being modified on the BUS and DTS entry is found, then that entry is invalidated in the corresponding cache. Performing this operation without the DTS would mean wasting many cycles in the caches to compare the cache tags against BUS memory modify transactions.

The DTS are addressed (as are the principal caches) with virtual addresses. The BUS 64 deals only with physical addresses so that the virtual address of a transaction is formed by using the 12 least significant bits (LSB's) of the physical address which are the same as the 12 LSB's of the virtual address and concatenating them with enough of the virtual address to index the cache. In the case of the processor's 128kB instruction cache 50, five virtual bits are required. In the case of the processor's 64kB data cache, 52, four virtual bits are required. These bits accompany the physical address on the BUS.

Figure 2:
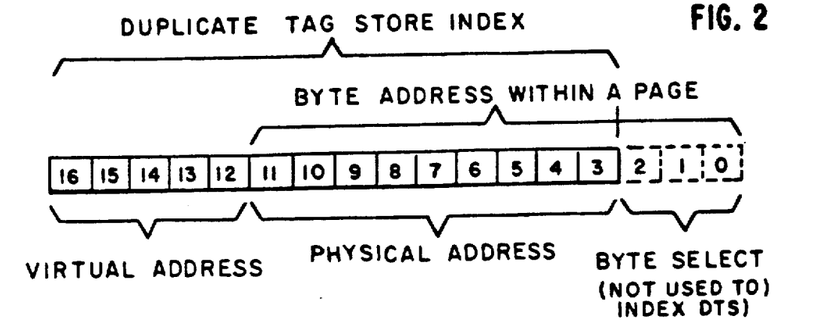
FIG. 2 is a bit map of a signal provided according to one embodiment of the present invention.

As shown in FIG. 2, Bits 16 through 3 are used to address the duplicate tag store. Bits 16 through 12 are taken from the virtual address (VPN) of the BUS transaction and bits 11 through 3 are taken from the physical address (PA). One less bit is required to address the duplicate operand cache store 54 than the duplicate instruction cache store. Only 13 bits are used to address the DOTS, bit 16 is tied to a fixed value. DITS and DOTS are commonly addressed.

Each DTS entry contains:
an 18 bit physical tag field, and
a 1 bit parity check bit field.

The physical tag is the 18 bit physical page number which along with a 12 bit byte index addresses 1 gigabyte (30 bits) of physical address space. There is no explicit valid bit. An invalid entry will simply point to an unlikely memory location, 0.

Example:
physical tag = 000000000000000000
parity bit = 1

Duplicate Tag store operations can be divided into the following categories of
DTS lookup,
DTS hit,
DTS allocate from processor write, and
DTS allocate from read response.
DTS entry purge Any time some other system device (including another processor modifies a memory location, the DTS is checked to see if that location is currently resident in either one of the processor's caches. If it is Present then a cache cycle is stolen from the affected cache that contains that location, and the entry in the cache as well as the entry in the DTS is invalidated. The DTS may actually have labeled as valid entries which are not valid in the caches. The only effect this will have is to generate a needless cache invalidate cycle.

The DTS is updated in two separate situations just as the main caches are. the first is when the processor modifies a location by executing a STORE operation. The second is when a cache miss is generated and the data returns on the BUS.

A joint lookup of the DITS and DOTS is Performed whenever a WRITE from another device or a WRITE multiple followed by WRITE DATA from another device are detected on the BUS. A lookup only of the DITS is performed whenever a WRITE from this processor or a WRITE DATA from this processor is detected on the BUS. The DTS lookup is basically handled in three pipeline stages including COMMAND DECODE, DTS ACCESS and TAG COMPARE. The stages are slaved to the operation of the BUS 58.

In the first cycle after the BUS write transaction, the command (CMD)field is decoded. If a WRITE operation is decoded then the address to be used as a DTS index is loaded into the DTS INDEX register. The following cycle the DITS is accessed in a read operation and the DOTS is optionally accessed. The tags are compared as required to the physical page number (PPN). If the PPN and DTS tag match, a cache entry invalidate and a DTS entry invalidate are scheduled

TABLE 1

|       | 1  | 2  | 3  |
|-------|----|----|----|
| X-BUS | WR |    |    |
| CMD DCD |  | WR |    |
| DTS   |    |    | WR |

DTS LOOKUP PIPELINE for WRITE or WRITE UNLOCK

Where CYCLE 1 is a WRITE transaction on bus, the transaction is loaded into the BIF's BUS input registers. CYCLE 2 the command is decoded. If it is a WRITE the DTS index reg is loaded from the physical address and the VPN. The physical address is piped forward for the tag compare(s). CYCLE 3 a DTS read access takes place, the tag is compared to the physical address. If a match occurs, a cache entry invalidate and a DTS entry invalidate are scheduled.

If the command is decoded and determined to be a WRITE MULTIPLE transaction then the address is stored in the DTS index. During the following cycle when the corresponding WRITE MULTIPLE DATA is decoded the first lookup is optionally done if the WRITE MULTIPLE began on an odd longword boundary. Otherwise, the address is held in the DTSINDEX. Thereafter, the DTSINDEX is loaded with its former contents plus or minus 8 bytes, depending on whether the WRITE MULTIPLE was ascending or descending, in anticipation of the next WRITE MULTIPLE DATA cycle.

TABLE 2

|       | 1  | 2   | 3   | 4   | 5   |
|-------|----|-----|-----|-----|-----|
| X-BUS | WM | WD$_1$ | WD$_2$ |     |     |
| CMD DCD |  | WM  | WD$_1$ | WD$_2$ |     |
| DTS   |    |     | WD$_0$ | WD$_1$ | WD$_2$ |

DTS LOOKUP PIPELINE SCHEDULE for
WRITE MULTIPLE with TWO DATA TRANSFER CYCLES

Where CYCLE 1 is a WRITE MULTIPLE (WM) transaction on bus, the transaction is loaded into the BIF's BUS input registers. In CYCLE 2 the command is decoded. If it is a WRITE MULTIPLE the address formed to index the DTS is loaded into the DTSINDEX register. At this time the first quadword of the WRITE MULTIPLE DATA is on the BUS (WD$_1$) In CYCLE 3, WRITE MULTIPLE DATA is decoded and the address in the DTSINDEX is optionally incremented or decremented by 4 bytes. The optional odd longword, WD$_0$, lookup occurs. If a match occurs cache entry invalidate and DTS entry invalidate are scheduled. In CYCLE 4 a DTS read access takes place for WD$_1$, the tag is compared to the physical address. If a match occurs a cache entry invalidate and DTS entry invalidate are scheduled. In CYCLE 5 a DTS read access takes place for WD$_2$, the tag is compared to the physical address. If a match occurs schedule cache entry invalidate and DTS entry invalidate.

When a memory modify operation by another device causes a hit in either DTS, or a locally generated write hits in the DITS, two events are scheduled. The first is an invalidate of the entry or entries which caused the hit in the main cache and the second is an invalidate of that entry or entries in the DTS in order to maintain the DTS consistent with the main caches.

It usually takes six cycles for a WRITE modifying a memory location which is also in the local caches to proceed from the BUS to that entry being invalidated. These cycles include transaction on BUS, command decoded, DTS accessed, PA bus arbitration, PA BUS-/EASRC/PCSRC transfer, and cache tag write(s) cycle. Also during the fifth of these cycles, the DTS entry invalidate is placed in the purge queue awaiting a free DTS cycle.

Once a code hit has been detected, the hitting index is loaded into the address register of the cache corresponding to the DTS in which it has hit. The cycle after the DTS lookup is used to complete the address compare and request the use of the PA bus the following cycle. The PA bus is the transport medium to the primary caches. The PA bus will always be available except when the DTS invalidate pipeline is pre-empted by a READ RESPONSE operation filling a cache miss (discussed later). The cycle following PA arbitration the index is driven off the BIF address chip and the drivers to either the PCSRC bus or the EASRC bus or both, which are enabled by the memory management unit (MMU) 60. An index hitting the DITS makes it's way to the program counter (PC) register while one hitting in the DOTS must be loaded into the effective address (EA) register. An index hitting in both the DITS and DOTS will be loaded into both EA and PC register.

TABLE 3

|  | 1 | 2 | 3 | 4 | 5 | 6 |
|---|---|---|---|---|---|---|
| X-BUS | $W_1$ | $W_2$ |  |  |  |  |
| CMD DCD |  | $W_1$ | $W_2$ |  |  |  |
| DTS |  |  | $W_1$ | $W_2$ | OTS $INV_1$ | OTS $INV_2$ |
| PASRC ARB |  |  |  | $W_1$ | $W_2$ |  |
| PASRC |  |  |  |  | $W_1$ | $W_2$ |
| CACHE |  |  |  |  | $W_1$ | $W_2$ |

DTS HIT WITH CACHE ENTRY INVALIDATE and DELAYED DTS ENTRY INVALIDATE

Where CYCLE 1 is a WRITE (W) transaction on the bus, the transaction is loaded into the BIF's BUS input registers. In CYCLE 2 the command is decoded. The physical address is piped forward for the tag compare. The virtual index is loaded into the DTS index register. In CYCLE 3 a read operation is performed on the DTS. In CYCLE 4 the results of the tag compare are available. Since there was a hit the PASRC bus is requested. In CYCLE 5 the virtual index of the location to be invalidated is passed via the PASRC bus to the appropriate cache address register. The DTS entry invalidate(s) are entered into the purge queue for execution when DTS is available. In CYCLE 6 the cache entry causing the DTS hit is invalidated.

When the processor modifies an operand cache location via a store instruction the DOTS must also be updated to reflect the cache's new state. The update occurs after the transaction is placed on the BUS. This avoids DTS conflicts by using the BUS as a synchronization point for DTS access. Only one device can use the BUS at a time and that device had to arbitrate to obtain the bus. The only DTS operations which are not synchronized through the BUS are the DTS entry invalidates and those are lower priority than the rest.

When the bus interface (BIF) address chip decodes a WRITE operation on the BUS it will write the new tag into the DOTS while doing a lookup into the DITS. The DITS lookup procedure has been previously described. A hit occurring in the DITS at this point means that the processor is modifying a location that has been cached in the instruction cache. An instruction cache entry invalidate and a DITS entry purge are scheduled.

While the DTS write allocate is occurring the DTS index must be compared against all the indices in the DTS entry invalidate queue that are scheduled to invalidate an entry in the DOTS. If any of the compares succeed then that DTS entry invalidate must itself be invalidated. If the invalidate was scheduled for both the DITS and DOTS then it is retagged as being only for the DITS. In this way an old pending DOTS entry invalidate won't destroy a recently allocated entry.

A WRITE MULTIPLE from the processor will be treated just like a WRITE MULTIPLE from another device with the only difference being that the DOTS is written into with the physical tag rather than read and checked for tag match.

TABLE 4

|  | 1 | 2 | 3 |
|---|---|---|---|
| X-BUS | PW |  |  |
| CMD DCD |  | PW |  |
| DTS |  |  | PW |

DTS ALLOCATE from PROCESSOR WRITE

Where in CYCLE 1, processor write is placed on BUS from WRITE BUFFER, in CYCLE 2, the write is decoded and also determined to be from the same processor. In CYCLE 3, the DOTS is updated with the new physical tag. The DITS is checked for a tag compare and if a hit occurs the instruction cache entry invalidate and DITS entry invalidate are scheduled in the usual way.

The DTS is also written upon the return of READ RESPONSE in reply to a READ MULTIPLE made by the same processor. When a "cacheable" miss occurs in a cache a READ MULTIPLE request is sent to main memory. Main memory returns the requested data in the form of successive READ RESPONSE(S). Upon decoding the expected READ RESPONSE command the BIF sends the associated tag to the awaiting cache and enters the tag into the DTS using the conventional DTS pipeline. No tag comparison is performed during this DTS cycle and only the DTS corresponding to the cache that missed is updated.

Three sets of addresses must be stored and manipulated in addressing the DTS. The DTS index register already mentioned is used in processing WRITE MULTIPLES, and two registers to hold the addresses associated with two possible pending cache miss READ RESPONSES.

TABLE 5

|  | 1 | 2 | 3 | N=1 | N | N+1 | N+2 | N+3 |
|---|---|---|---|---|---|---|---|---|
| X-BUS | RM |  |  |  |  | $RR_1$ | $RR_2$ |  |
| CMD DCD |  | RM |  |  |  |  | $RR_1$ | $RR_2$ |
| DTS |  |  |  |  |  |  | $RR_1$ | $RR_2$ |

READ MULTIPLE REQUEST and READ RESPONSE SCENARIO with DTS UPDATE

In the situation illustrated in Table 5, CYCLE 1, a cache miss causes the BIF to place a READ MULTIPLE request on the BUS. In CYCLE 2, the command is decoded and is determined to be a self-generated READ MULTIPLE. The VPN and physical address are stored in the appropriate pending operation holding register depending on the BUS SUBID signalling whether it is an instruction or operand cache miss. In CYCLE 3 ... N-1, the memory subsystem is processing the READ MULTIPLE. In CYCLE N, the memory subsystem places the first of two READ RESPONSE transactions on the BUS. In CYCLE N+1, the second READ RESPONSE is on the BUS. The first READ RESPONSE is decoded and the corresponding address is loaded from the holding register to the DTS index. The holding register is then loaded with it's contents ±8 bytes depending on the ordering for that type of operation. (I-miss or D-miss). In CYCLE N+2, the first READ RESPONSE is updating the DTS. The second READ RESPONSE is decoded and the contents of the holding register are again transferred to the DTS index register and the holding register is stepped (+8 bytes). In CYCLE N+3, the second READ RESPONSE updates the DTS.

To avoid repetitive invalidations of the same cache location by subsequent bus writes, it is highly desirable to invalidate the tag entry in both the primary and duplicate tag stores. The primary tag store is always invalidated in the 6th cycle of the invalidate pipeline. Unfortunately, the bandwidth of the duplicate tag store may be fully consumed by the bus activity to which it is slaved. So the duplicate tag store can only be scheduled for invalidation at some later point. The purge queue is a variable length queue which holds these scheduled but unacted upon DITS and DOTS invalidates.

Figure 3:
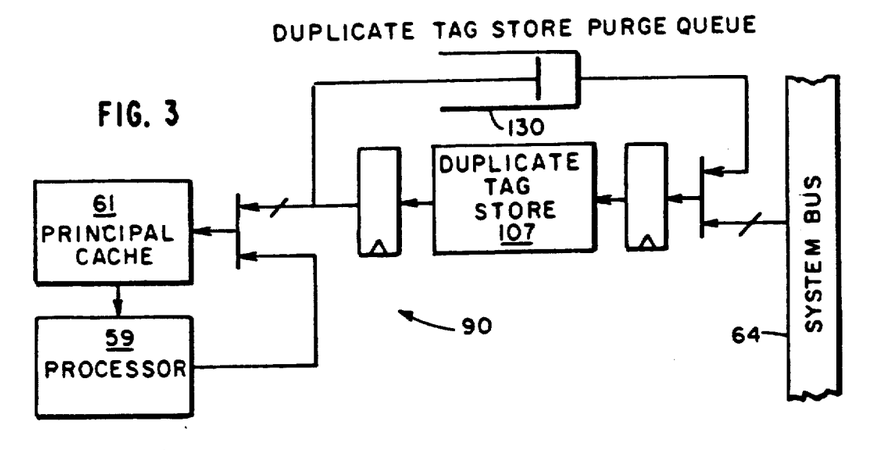
FIG. 3 is a block diagram of the overview of one system embodiment according to the present invention.
Figure 4:
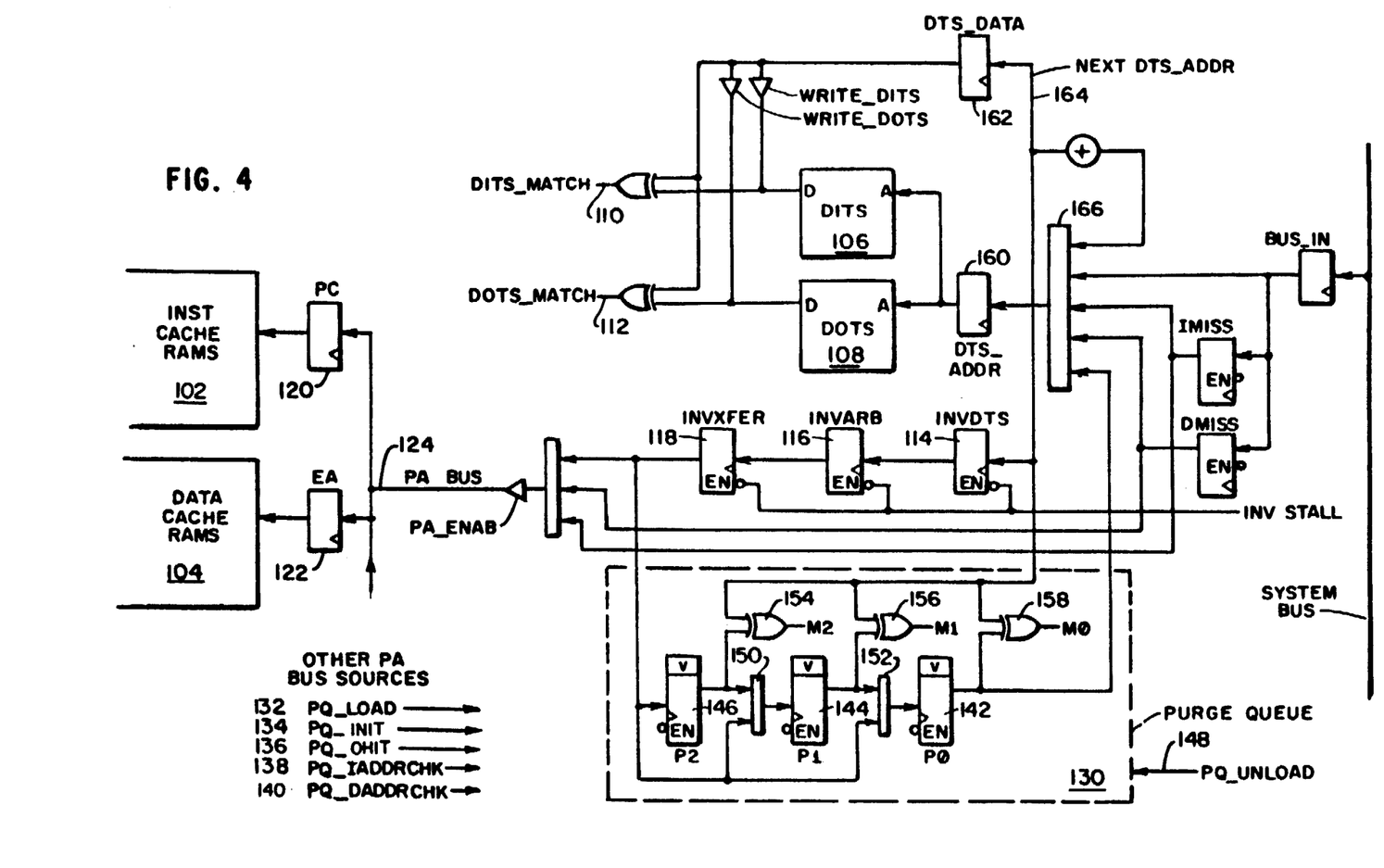
FIG. 4 is a more detailed block diagram of the system of FIG. 3.

Somewhat more detail is offered in FIG. 4, while a system overview of the implementation duplicate tag store purge queue 130 is shown in FIG. 3, where a principal cache 61 provides a processor 59 with data/instruction. A duplicate set of tags are maintained for the benefit of bus write address checking. A duplicate tag purge queue 130 selectively receives tag indicia from the tag store 107 and selectively invalidates tag information as discussed below. FIG. 4, shows those portions of the bus interface 100 that are related to invalidate processing. When a collision is detected in either the DITS 106 or in the DOTS 108, the signals DITS_MATCH 110 or DOTS_MATCH 112 are asserted. The assertion of either of these signals in the DTS lookup cycle cause the cache index held in INVDTS 114 to be forwarded through the InVARB 116 and INVXFER 118 registers to the affected primary cache tag store index register: PC 120 or EA 122. Primary tag store invalidation happens in the cycle following and involves clearing the valid bits in the tag RAM's associated with instruction cache 102 or data cache 104. Simultaneously with the transfer of the cache index on the PA bus 124 from the INVXFER register 118, the index is also presented to the purge queue 130. The signal PQ_LOAD 132 is asserted at this time. This happens in cycle 5 of the six state sequence. Accompanying the index, which has both physical and virtual components, are indications of whether there was a match in the DITS (signal PQ_IHIT 134 is asserted), the DOTS (signal PQ OMIT 136 is asserted) or both.

The purge queue 130 is composed of a number of entries. In the figure, three entries are drawn P0 (142), P1 (144) and P2 (146). Each entry holds the 14 bit duplicate tag store index and validity indications. The latter may be used to decide whether the queue is full or empty. The validity indications are also used to decide which duplicate tag store to invalidate at the time the entry is removed from purge_queue.

If the purge queue is full, and is not being unloaded in the same cycle, the index is simply discarded. The purge queue is full if all entries 142, 144 and 146 are marked as valid. The queue is being unloaded if PQ_UNLOAD 148 is asserted. This discarding can be done because it is not an absolute requirement that the primary and duplicate tag stores are identical. It is only required that, if the primary tag store is valid, so too is its duplicate. The converse need not be.

If the purge queue is not full, or if it is being simultaneously unloaded, the index is accepted in the first empty slot of the purge queue. The first empty slot is 142 if the queue is empty or has one entry and is being simultaneously unloaded. The first empty entry is 144 if there is only one entry in the queue or if there are two entries and the queue is being simultaneously unloaded. The first empty entry is 146 if there are only two entries in the queue or if there are three entries and the queue is being simultaneously unloaded. The queue is therefore designed to be fall-through and synchronous. The cascade of 2:1 multiplexers 150 and 152 in the purge queue is to allow for the forward rippling of valid entries as well as the parallel loading of a new entry at any juncture in the queue. As noted, besides the duplicate tag store index, and an overall queue entry validity indication, the DITS and DOTS collision indications: PQ INST 134 and PQ_DHIT 136 are entered into the queue.

If the purge queue is not empty, entries are unloaded from the queue when the DTS_ADDR register 160 will be idle in the next cycle. In effect, the purge queue 130 is of lower priority in the request of the DITS and DOTS than is the bus. When an index is unloaded from the purge queue, the collision indications are used to decide which of the DITS or DOTS or both is to be written to. The value to be written, as placed in the DTS_DATA register 162, is 0 which is synonymous with invalid.

While an index is languishing in the purge queue 130, it is possible that the DITS or DOTS index to which it points is reused. It would then be a mistake to invalidate the now re-used duplicate tag store entry. For this reason, the comparators 154, 156 and 158 are placed in every purge queue entry to check the entry contents against the NEXT_DTS ADDR 164, produced by the 5:1 multiplexor 166 at the time of DITS or DOTS reallocation. The indication of whether the DITS is reused is the signal PQ_IADDRCHK 138 and whether the DOTS is reused is the signal PQ_DADDRCHK 148. If there is a purge queue entry targeted at the index, as determined by the comparators 154, 156 and 158, the purge queue entry or entries affiliated with the matching comparators must be cancelled. Note that this may not allow the entry to be completely eliminated because it still may be required to invalidate the other of the two tag stores. Note also that the comparators are not needed for the INVDTS 114, INVARB 116 and INVXFER 118 registers simply because the primary cache invalidate will subsequently happen regardless of the reuse of the duplicate tag store entry. A second use of the comparators may be to eliminate redundant DITS or DOTS invalidations.

A complication also arises in that the DOTS and DITS are of differing sizes. Specifically, the DOTS requires a 13-bit index while the DITS requires 14.

However, this is allowed for in the comparison operations just described.

Further details, of related methods and systems are provided in U.S. application Ser. No. 07/636,566, entitled APPARATUS FOR SELECTIVE EXECUTION OF INSTRUCTIONS FOLLOWING A BRANCH INSTRUCTION, filed Oct. 18, 1988, and U.S. application Ser. No. 07/544,049, now U.S. pat. No. 5,163,142, entitled AN EFFICIENT CACHE WRITE TECHNIQUE THROUGH DEFERRED TAG MODIFICATION, both incorporated herein by reference. Modifications and substitutions made by one of ordinary skill in the art are within the scope of the present invention, which is not to be limited, except by the claims which follow:

APPENDIX I

We claim:

1. A high speed processing system, comprising:
   - at least one processor having memory;
   - a synchronous bus for conveying data at least between said at least one processor and said memory at selectively clocked cycle time intervals;
   - a plurality of cache memories in communication with at least said synchronous bus and comprising at least one instruction cache memory for operation in accordance with instruction transactions and at least one data cache memory for operation in accordance with data transactions;
   - a plurality of tag stores comprising a first tag store responsive to said at least one instruction cache memory, for storing at least a first tag indicative of instruction contents of at least one instruction cache memory location, and a second tag store responsive to said at least one data cache memory, for storing at least a second tag indicative of operand contents of at least one data cache memory location; and
   - a cache transfer coherency mechanism comprising at least one duplicate tag store for storing signals indicative of a copy of at least a selected one of said at least said first tag and said at least said second tag, said cache transfer coherency mechanism further comprising at least one duplicate tag store purge queue, responsive to said synchronous bus, said at least one duplicate tag store purge queue receiving and storing at least one of said signals indicative of at least said first tag and said at least said second tag which require invalidation in said at least one duplicate tag store and said at least one duplicate tag store purge queue further including a comparison mechanism for comparing signals in said duplicate tag store purge queue with signals being stored in said duplicate tag store whereby signals in said duplicate tag store purge queue matching signals being stored in said duplicate tag store are deleted from said duplicate tag store purge queue to preclude invalidation of signals which are newly allocated to said duplicate tag store.

2. The high speed processor of claim 1 wherein said at least one duplicate tag store comprises:
   - at least one duplicate instruction tag store storing a duplicate of said at least said first tag; and
   - at least one duplicate data tag store storing a duplicate of said at least said second tag.

3. A high speed processing system, comprising:
   - at least one processor having memory;
   - a synchronous bus for conveying data at least between said at least one processor and said memory at selectively clocked cycle time intervals;
   - at least one cache memory in communication with at least said synchronous bus;
   - at least one tag store comprising a first tag store associated with said memory, for storing at least a first tag indicative of contents of at least one location of said at least one cache memory; and
   - a cache transfer coherency mechanism comprising at least one duplicate tag store for storing signals indicative of a copy of at least a selected one of said at least said first tag, said cache transfer coherency mechanism further comprising at least one duplicate tag store purge queue, responsive to said synchronous bus, said at least one duplicate tag store purge queue receiving and storing at least one of said signals indicative of said at least said first tag which require invalidation in said at least one duplicate tag store and said at least one duplicate tag store purge queue further including a comparison mechanism for comparing signals in said duplicate tag store purge queue with signals being stored in said duplicate tag store whereby signals in said duplicate tag store purge queue matching signals being stored in said duplicate tag store are deleted from said duplicate tag store purge queue to preclude invalidation of signals which are newly allocated to said duplicate tag store.

* * * * *